United States Patent
Martin et al.

(10) Patent No.: US 12,152,106 B2
(45) Date of Patent: Nov. 26, 2024

(54) ELECTRICALLY CONDUCTING POLYAMIDES

(71) Applicant: The Government of the United States of America, as represented by the Secretary of the Navy, Arlington, VA (US)

(72) Inventors: Brett D. Martin, Washington, DC (US); Jeffrey R. Deschamps, Washington, DC (US); Jeffrey C. DePriest, Washington, DC (US); Ian D. Giles, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 836 days.

(21) Appl. No.: 17/347,050

(22) Filed: Jun. 14, 2021

(65) Prior Publication Data
US 2021/0388162 A1    Dec. 16, 2021

Related U.S. Application Data

(60) Provisional application No. 63/038,936, filed on Jun. 15, 2020.

(51) Int. Cl.
*C08G 69/12*    (2006.01)
(52) U.S. Cl.
CPC .................................... *C08G 69/12* (2013.01)
(58) Field of Classification Search
None
See application file for complete search history.

(56) References Cited

U.S. PATENT DOCUMENTS

| | | | |
|---|---|---|---|
| 4,172,938 A | * | 10/1979 | Mera ............ C08G 69/12 528/319 |
| 5,260,329 A | | 11/1993 | Mongelli et al. |
| 6,562,859 B1 | | 5/2003 | Howard et al. |

FOREIGN PATENT DOCUMENTS

| KR | 10-2007-010893 A | 11/2007 |
|---|---|---|
| WO | 2005-016877 A2 | 2/2005 |

OTHER PUBLICATIONS

A. Cetin, A. Korkmaz, Materials Chemistry and Physics 222, (2019), 37-44.

(Continued)

*Primary Examiner* — Rachel Kahn
(74) *Attorney, Agent, or Firm* — US Naval Research Laboratory; Roy Roberts; Stephen T. Hunnius

(57) ABSTRACT

A new, thermally stable conducting material, poly(3-amino-1H-pyrazole-4-carboxylate), can be used in a variety of applications such as thermoelectrics, electron acceptors in light-harvesting (photovoltaic) materials, and thermally stable conducting energetic materials. Related compounds include poly 3-amino-5-chloro-1H-pyrazole-4-carboxylate, poly 3-amino-5-bromo-1H-pyrazole-4-carboxylate, poly 3-amino-5-fluoro-1H-pyrazole-4-carboxylate, poly 3-amino-5-iodo-1H-pyrazole-4-carboxylate, poly 3, 5-diamino-1H-pyrazole-4-carboxylate, poly 3-amino-5-NHR$_1$-1H-pyrazole-4-carboxylate, poly 3-amino-5-NR$_2$-1H-pyrazole-4-carboxylate, or poly 3-amino-5-hydroxy-1H-pyrazole-4-carboxylate.

12 Claims, 14 Drawing Sheets

(56) References Cited

OTHER PUBLICATIONS

A. Cetin, A. Korkmaz, I. Bildirici. Colloid and Polymer Science, 296, (2018), 1249-1257.
L. Stepian, A. Roch, R. Tkachov, B. Leupolt, L. Han, N. Ngo, C Leyens, Synthetic Metals, 225, (2017), 49-54.
M. Hokazono, H. Anno, N. Toshima, J. Electronic Materials, 43, 6, (2014), 2196-2201.
E. Vitoratos, S. Sakkopoulos, E. Dalas, N. Paliatsas, D. Karageorgopoulos, F. Petraki, S. Kennou, S.A. Choulis, Organic Electronics, 10, (2009), 61-66.
E. Raczyńska, W. Kosińska, B. Ośmiałowski, and R. Gawinecki, Chem. Rev. 105, (2005), 3561-3612.
M. Trchová, I. Šeděnková, E. Tobolková, J. Stejskal, Polymer Degradation and Stability, 86, (2004), 179-185.
International Search Report dated Oct. 12, 2021 in PCT/US2021/037233.
Written Opinion of the International Searching Authority dated Oct. 12, 2021 in PCT/US2021/037233.
White, S. et al., "Orientation Preferences of Pyrrole-imidazole Polyamides in the Minor Groove of DNA," J. Am. Chem. Soc., 1997, vol. 119, pp. 8756-8765.

\* cited by examiner

MW 552

MW 580

MW 922

ELECTRICALLY CONDUCTING POLYAMIDES

CROSS-REFERENCE TO RELATED APPLICATIONS

This Application claims the benefit of U.S. Provisional Application 63/038,936 filed on Jun. 15, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 111,774.

BACKGROUND

State of the art commercially available conducting polymers such as polyaniline (PANI) and poly(3,4 ethylenedioxy thiophene)/poly(styrene sulfonate) (PEDOT/PSS) experience thermal degradation in terms of both conductivity loss and mechanical integrity. This is the case in both nitrogen and air environments. For PANI, these effects arise from thermally-induced deprotonation (undoping) involving acid release by diffusion, dehydration, and evaporation. Other mechanisms that appear to contribute to the conductivity loss include aromatic ring substitution by dopant acids containing sulfonate or chloride ions [1]. PANI has been reported to display significant conductivity losses at temperatures of as low as 50° C., over a 24 hour period [1]. The conductivity decline of PEDOT/PSS is thought to arise from a heat-induced decrease in the polymer grain size, inhibiting grain-to-grain electron hopping mechanisms [2]. The conductivity of PEDOT/PSS has been reported to be stable indefinitely at relatively low temperatures (55° C.) [3] but begins to show a significant decline at temperatures of above 80° C. [3] [4].

A need exists for new materials.

BRIEF SUMMARY

Described herein are stable oligo- or polyamides that are inherently electrically conductive, have a high thermal stability, are inexpensive and simple to produce, and may have other advantages such as high mechanical strength.

In one embodiment, a material comprises poly 3-amino-1H-pyrazole-4-carboxylate, poly 3-amino-5-chloro-1H-pyrazole-4-carboxylate, poly 3-amino-5-bromo-1H-pyrazole-4-carboxylate, poly 3-amino-5-fluoro-1H-pyrazole-4-carboxylate, poly 3-amino-5-iodo-1H-pyrazole-4-carboxylate, poly 3, 5-diamino-1H-pyrazole-4-carboxylate, poly 3-amino-5-$NHR_1$-1H-pyrazole-4-carboxylate, poly 3-amino-5-$NR_2$-1H-pyrazole-4-carboxylate, poly 3-amino-5-hydroxy-1H-pyrazole-4-carboxylate, and/or poly 3-amino-5-OR-1H-pyrazole-4-carboxylate, where R is alkyl and/or aromatic.

Further embodiments include methods of preparing any of the materials of the first embodiment. For example, 3-amino-1H-pyrazole-4-carboxylate can be reacted in an aqueous solution of R1 hydroxide followed by the addition R2 persulfate (where R1 denotes one singly charged cation and R2 denotes two singly charged cations or one doubly charged cation), thus forming the desired material.

BRIEF DESCRIPTION OF THE DRAWINGS

FIG. 3A is a FTIR spectra of the monomer for Polyamide 1 while

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein is an electrically conducting amide polymer, poly(3-amino-1H pyrazole-4-carboxylate) (Polyamide 1) with high stability towards thermal decomposition. In embodiments, it is an 11-mer that can be formed in a simple one-step synthesis with yields as high as 90%. The conductivity is associated with the extended pi-conjugation that is present in the material. It is stable for at least 24 hours at a temperature of at least 150° C. It is expected to have a significant military and commercial interest, and can potentially be used in a variety of applications such as thermo-electrics, electron acceptors for light-harvesting (photovoltaic) materials, and thermally stable conducting energetic materials. To the best of our knowledge, this is the first example of a oligomer or polymer that is both highly stable towards thermal decomposition and is electrically conductive at a level comparable to that of commercially available conducting polymers.

Other polyamides related to Polyamide 1 have been synthesized by other groups using a three-step process, but their chain lengths were reported to be much shorter, three to four repeat units. They are semiconductors in nature, having reported conductivities roughly three orders of magnitude lower than found for Polyamide 1. These materials have useful optoelectronic properties and are being characterized to assess their value in these applications [5] [6] [7].

Figure 19:
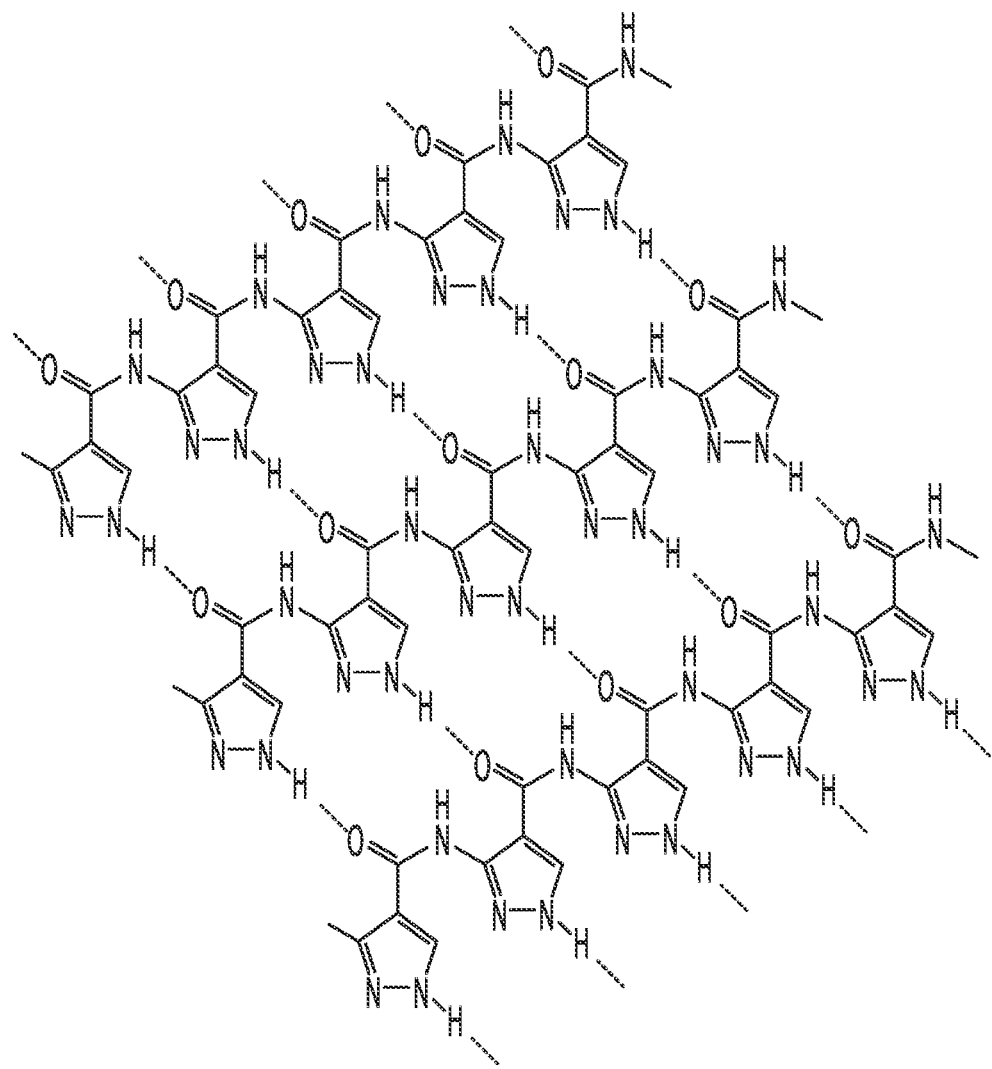
FIG. 19 illustrates a possible extended hydrogen-bonding structure in Polyamide 1.

Polyamide 1 has an electrical conductivity that enables it to be useful in a variety of applications, and has a high stability towards thermal decomposition. In contrast, other commercially available conducting polymers are far less thermally stable. It can be formed in a simple one-step synthesis with yields as high as 90%. Molecular modeling indicates that Polyamide 1 is capable of assembling into extended hydrogen-bonding structures (FIG. 19). This suggests that the material, if processed correctly, will have a high mechanical strength in addition to its conductivity and thermal stability.

Examples

Synthesis of Poly 3-amino-1H-pyrazole-4-carboxylate (Polyamide 1)

Figure 1:
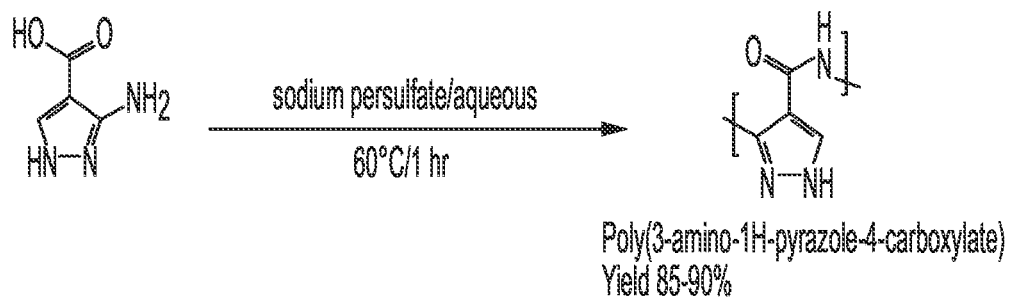
FIG. 1 illustrates synthesis of poly(3-amino-1H-pyrazole-4-carboxylate).

The synthesis is undertaken by adding 55 mL deionized water to a 100 mL Erlenmeyer flask, then dissolving 423 mg potassium hydroxide while stirring at room temperature. Next, 1.0 g 3-amino-1H-pyrazole-4-carboxylate is added and allowed to dissolve at 65° C. with heating in a mineral oil bath. This allows a 1:1 molar complex to form between potassium and the deprotonated nitrogen of the pyrazole ring. Next, 1.8 g of ammonium persulfate is added, giving a final molar ratio of 1.2 moles persulfate to 1.0 moles monomer. The reaction is allowed to proceed for 40 minutes at 60° C. Precipitate (polymer) begins to form at a reaction time of approximately 20 minutes. At the end of the reaction, the flask is then removed and allowed to cool to room temperature. The polymer product, a dark brown powder, will continue to precipitate over time. The reaction yield can be quantified by drying off the aqueous solvent, and subjecting the residue to extraction with N-methyl pyrrolidone (NMP). This will dissolve the polymer while leaving salt by-products behind. Removal of the NMP by drying followed by washing with water yields isolated product. The overall yield of the reaction was found to be 85-90%. The product, poly 3-amino-1H-pyrazole-4-carboxylate (Polyamide 1) (FIG. 1) was characterized by UV-visible spectroscopy, mass spectrometry, FTIR spectroscopy, NMR, and thermogravimetric analysis, and thin films were characterized electrochemically via electrochemical impedance spectroscopy.

Figure 2:
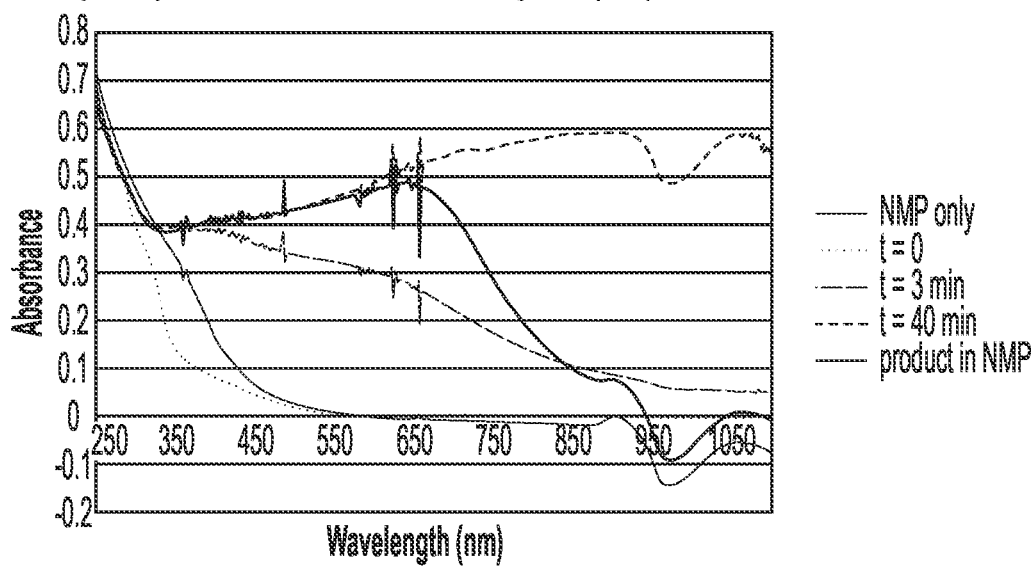
FIG. 2 provides UV-visible spectra of Polyamide 1 at various times during its synthesis, and isolated material.

The polymerization was relatively rapid, with completion of the reaction occurring at 40 minutes, as shown by UV-visible spectroscopy (FIG. 2). Spectroscopy was performed by removing aliquots from the aqueous reaction mixture and diluting them into NMP (N-methyl pyrrolidone) solvent at a ratio of 1 to 9. The spectra shows that the polymer product absorbs strongly up to 1050 nm, indicating that long conjugation lengths are present. When the isolated powder product is re-dissolved in NMP and characterized spectroscopically, it shows strong absorption up to 650 nm. The gradual decline in absorption at higher wavelengths may indicate that the presence of a small amount of water is necessary for complete solvation of the polymer. The pseudo-first order rate constant for the reaction was calculated using the UV-visible spectrum, and quantifying the position of the shoulder at 630 nm as a function of time. It was found to be 0.616 min$^{-1}$.

Figure 3A:
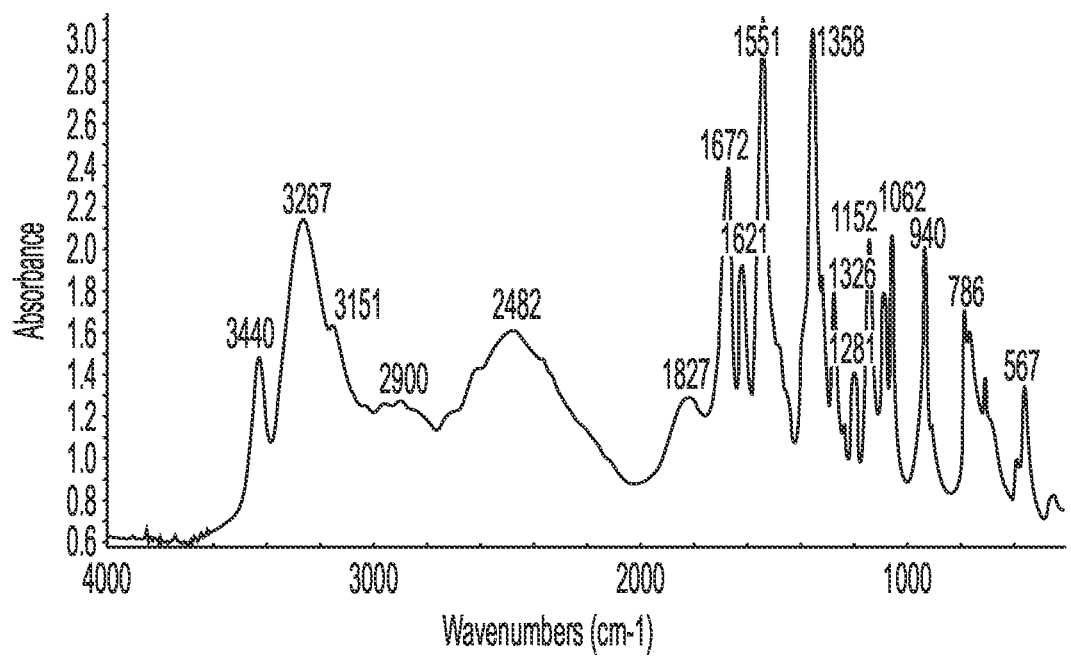
Figure 3B:
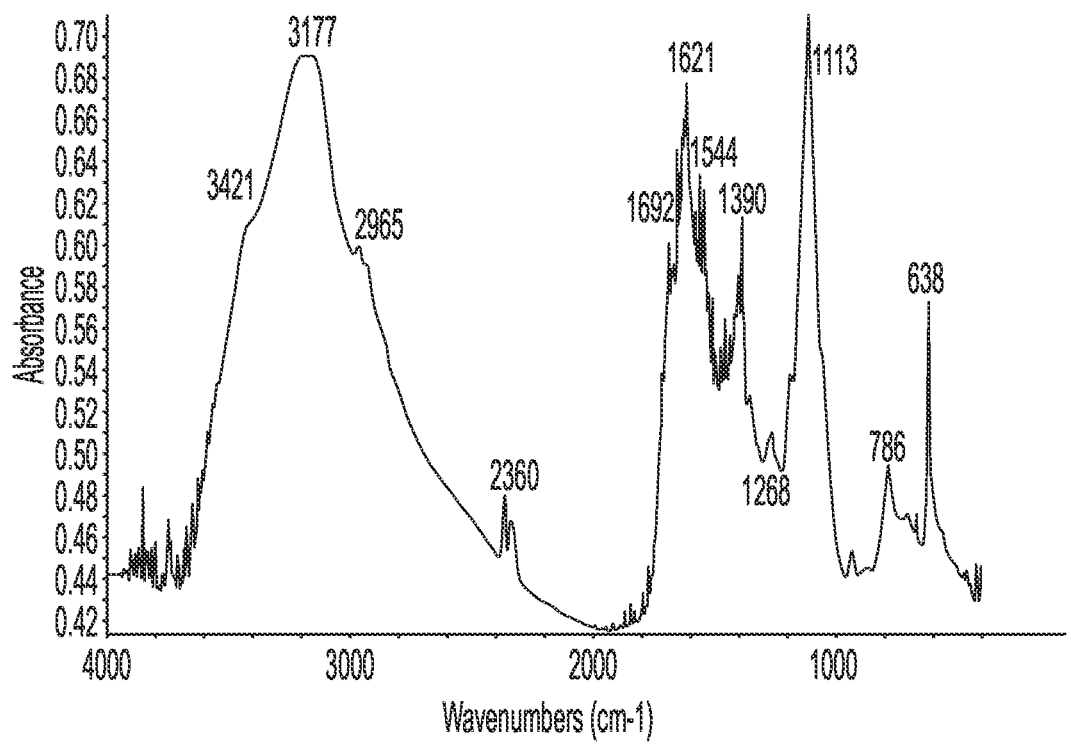
FIG. 3B is a FTIR spectra of Polyamide 1.

The FTIR spectra of the starting compound 3-amino-1H pyrazole-4-carboxylate and that of Polyamide 1 are shown in FIGS. 3a and 3b. The carboxylate group is evident by the strong, broad OH-stretch ranging from 3267 cm$^{-1}$ to 2482 cm$^{-1}$. Also present are the CO stretch evident by the bands at 1326 cm$^{-1}$ and 1281 cm$^{-1}$, and the OH bend indicated by the bands at 1358 cm$^{-1}$ and 940 cm$^{-1}$. In the Polyamide 1 spectrum, the broad OH-stretch band is completely absent, and the latter two bands also are not present. This spectrum contains bands associated with the amide N—H stretch (3421 cm$^{-1}$) and NH bend (1544 cm$^{-1}$) as well as the amide C=O stretch (1621 cm$^{-1}$) and aromatic C=C stretch (1692 cm$^{-1}$).

Figure 4:
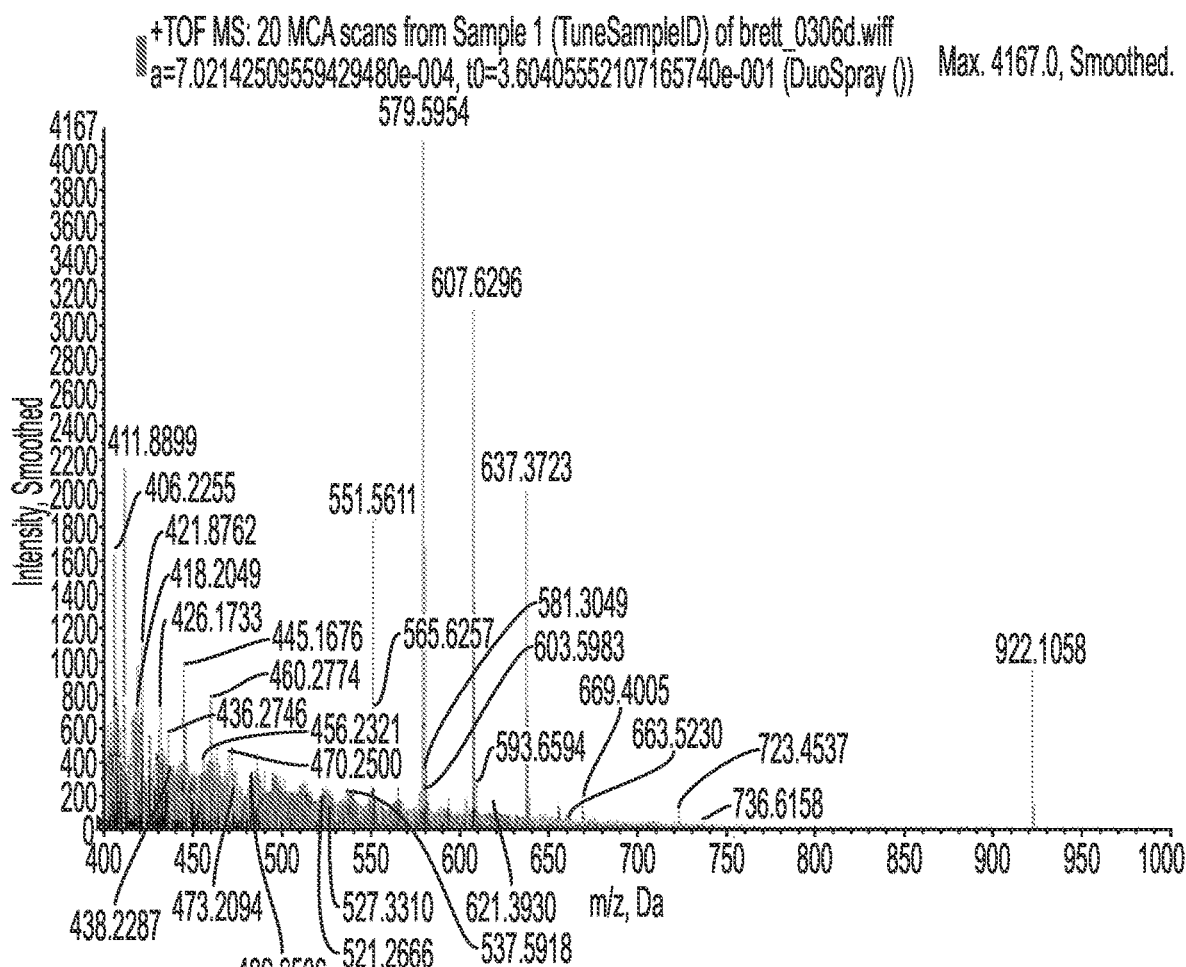
FIG. 4 shows a positive ion MS of Polyamide 1.
Figure 5:
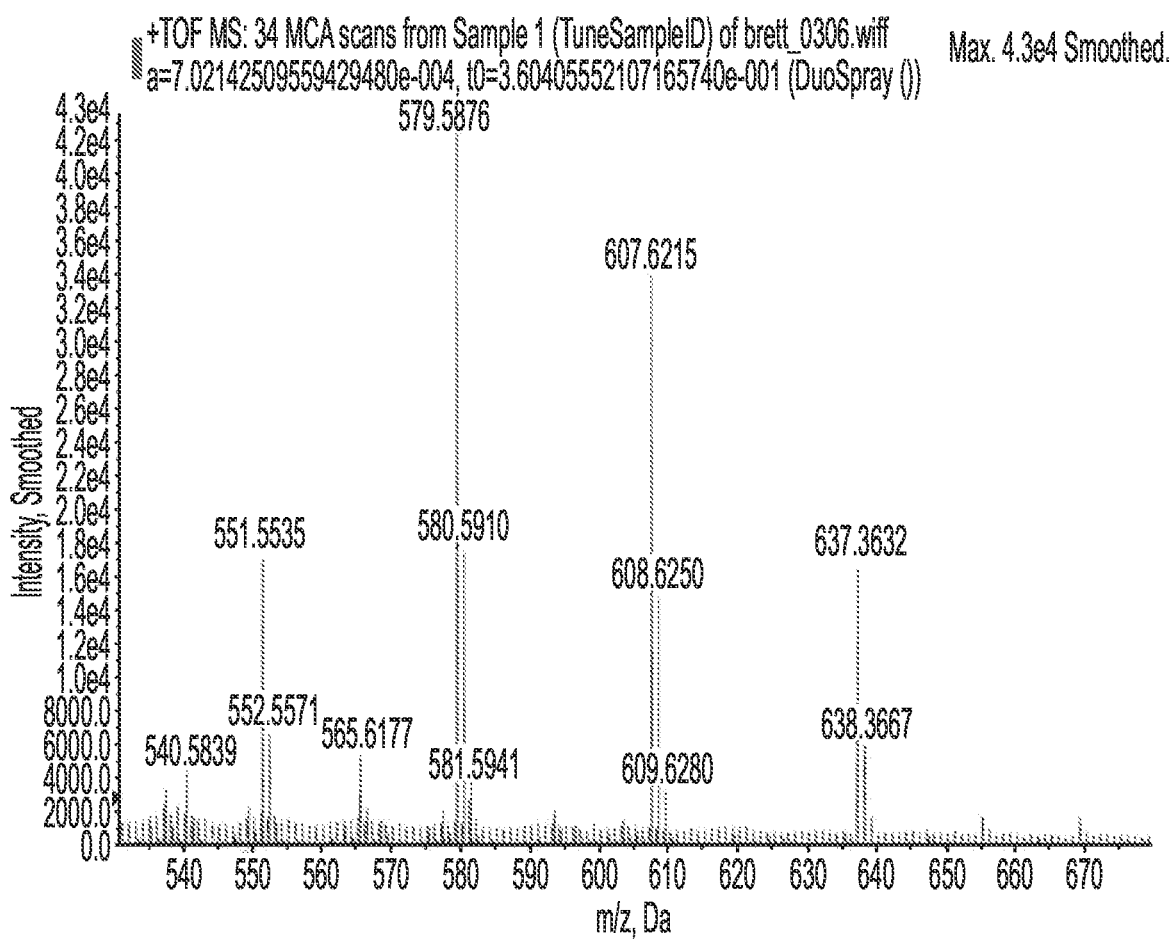
FIG. 5 provides a positive ion MS of Polyamide 1 in smaller fragments than in FIG. 4.
Figure 6A:
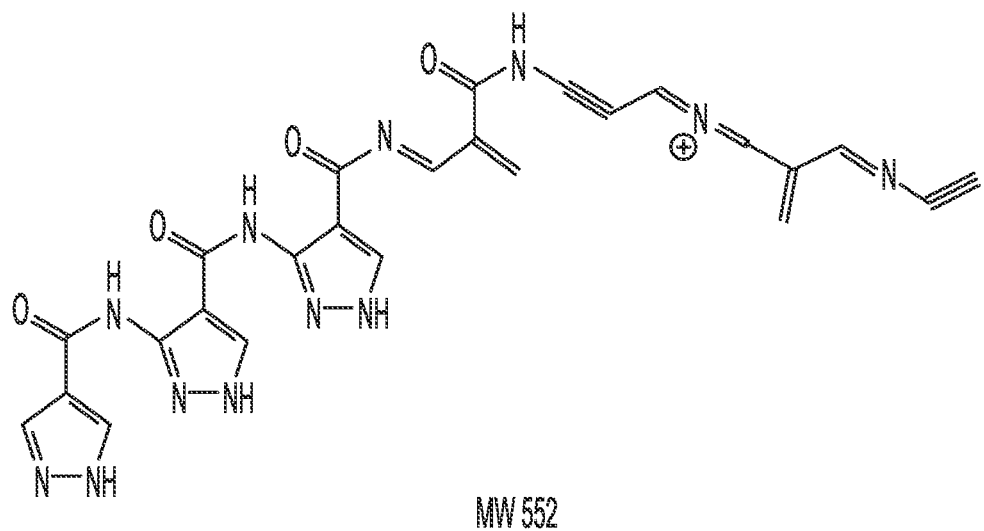
FIGS. 6A-6D are proposed structures of the MS fragments of molecular weight (MW) 552 D, 580 D, 608 D, and 637 D, respectively.
Figure 6B:
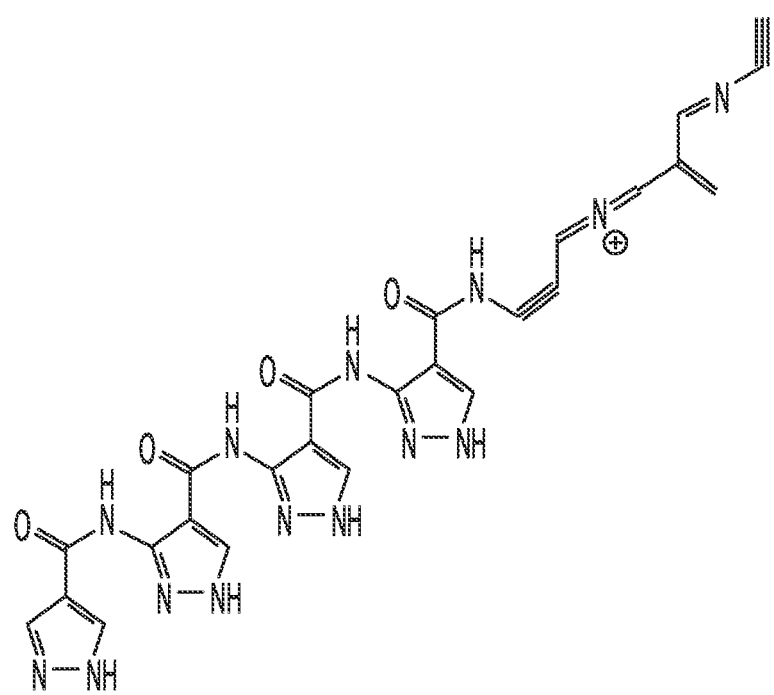
Figure 6C:
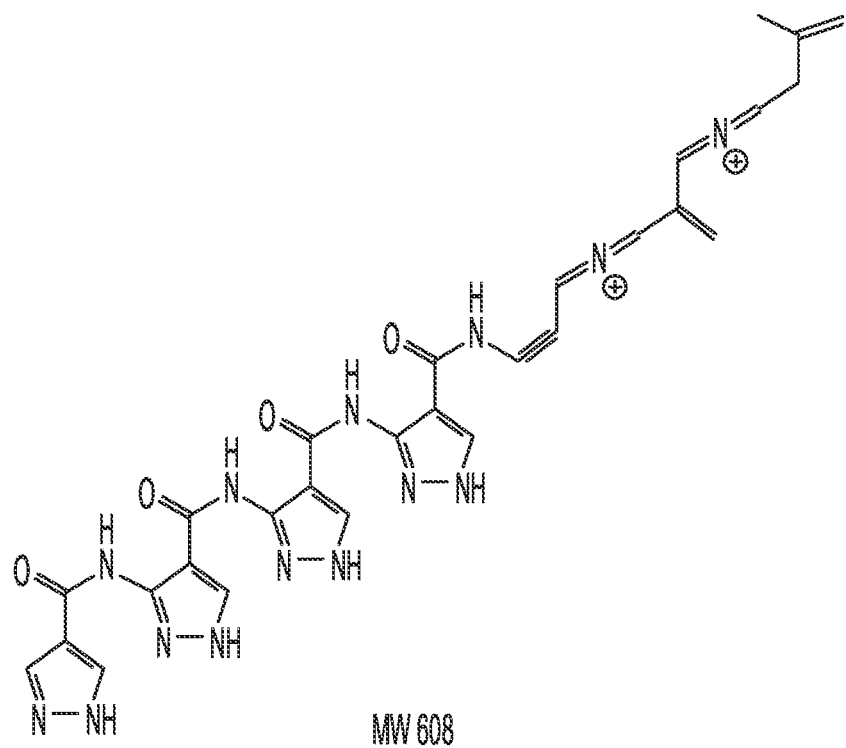
Figure 6D:
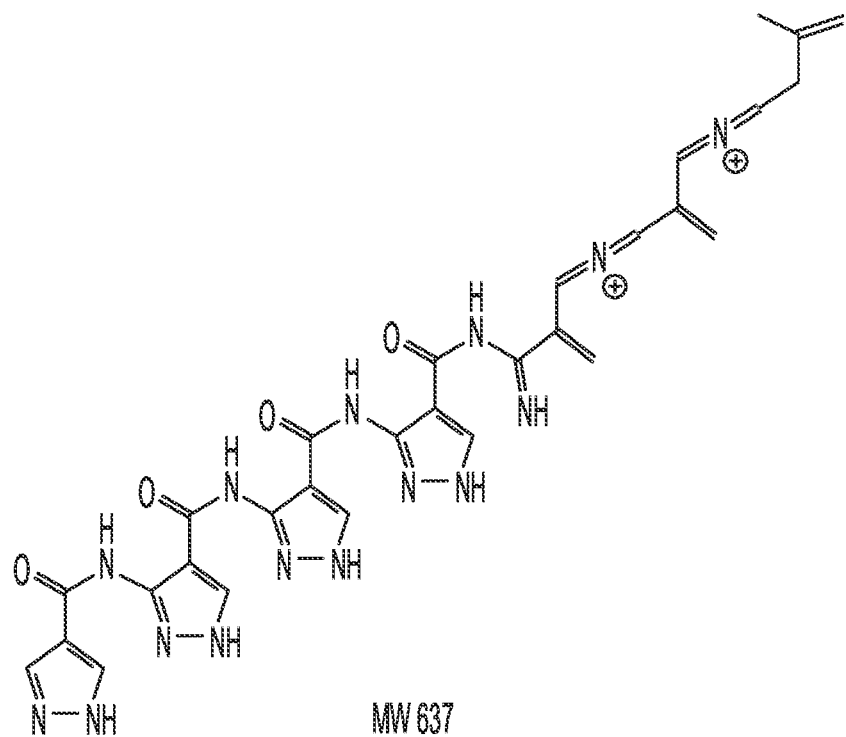
Figure 7:
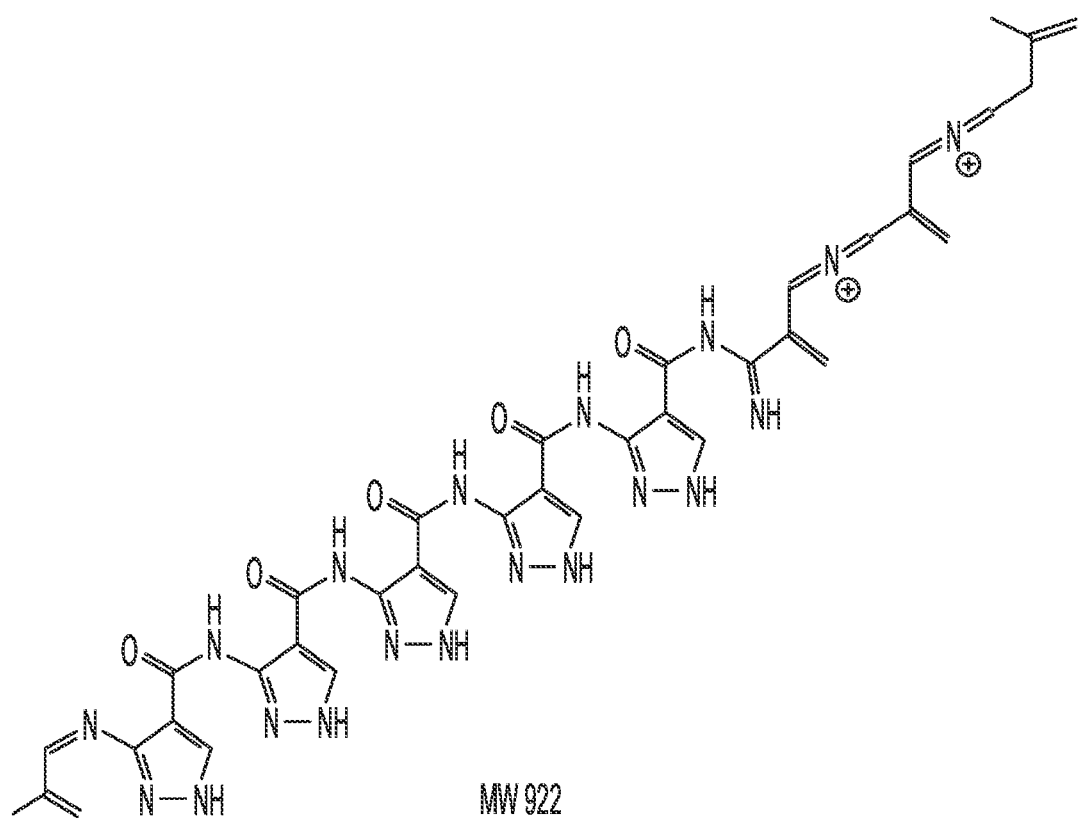
FIG. 7 is a proposed structures of the largest MS fragment with a MW of 922 D.

Mass spectrometry was performed on Polyamide 1, and relatively large positive fragment sizes ranging from 552 D to 922 D were obtained (FIG. 4). The highest value indicates that the average polymer length is an 11-mer. Four fragments are shown in FIG. 5, having MWs of 637, 608, 580, and 552 D. This likely indicates sequential loss of $N_2$ from the pyrazole ring. FIGS. 6a-d depict the proposed structures of these fragments. The fragment with the highest MW (922 D) is shown in FIG. 7, which appears to be a residue from an 11-mer.

Figure 8:
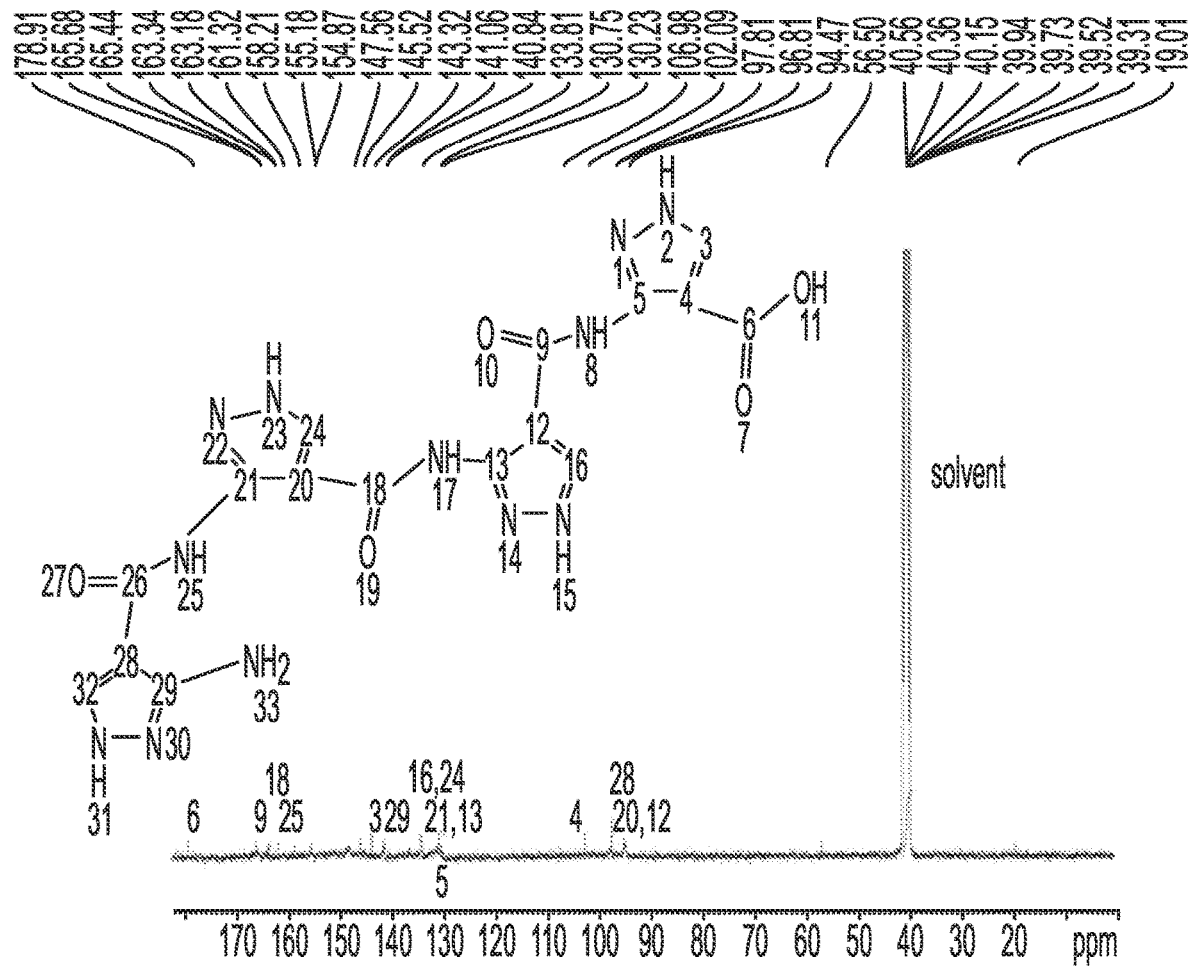
FIG. 8 is a $^{13}C$ NMR spectra of Polyamide 1.

The $^{13}C$ NMR spectrum of Polyamide 1 (DMSO-d6 solvent) is shown in FIG. 8. Carbons in at least 15 different positions in the polymer chain can be identified. The inset structure shows results from NMR software predictions. The spectrum corresponds well with the mass spectral data discussed above.

Figure 9A:
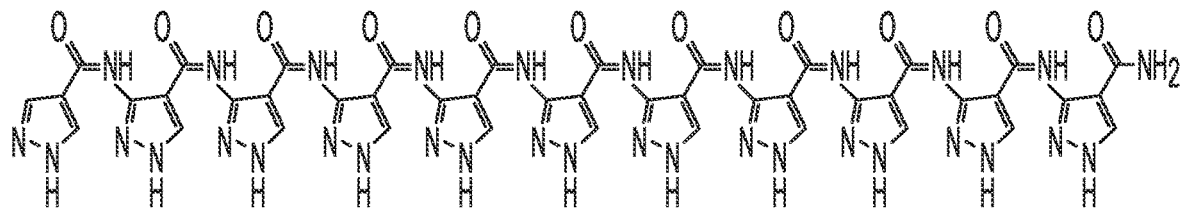
FIGS. 9A and 9B provide structures of polyamide 1 in its undoped state, amide form (A) and iminol form (B).
Figure 9B:
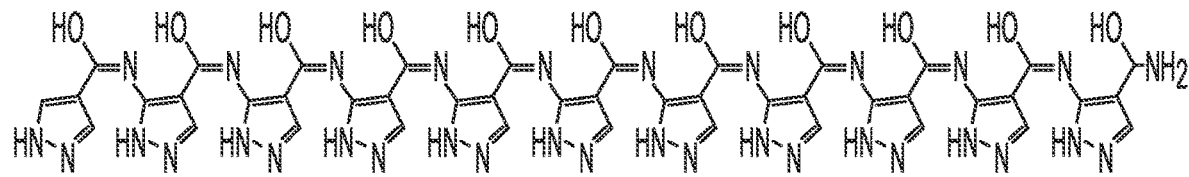
Figure 10A:
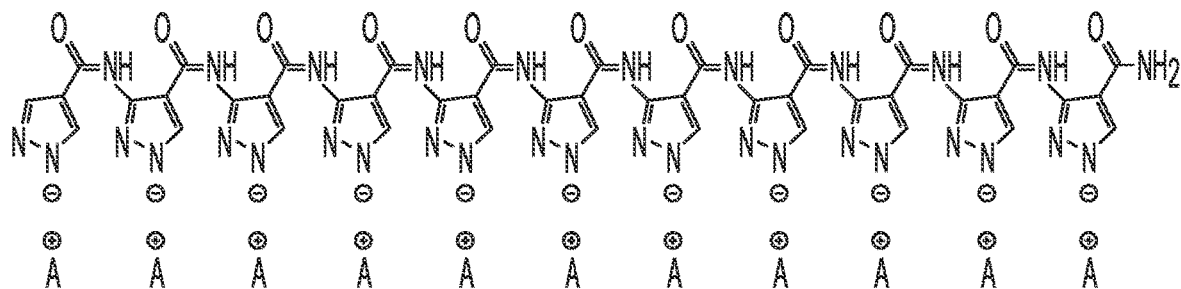
FIGS. 10A and 10B provide structures of polyamide 1 in its undoped state, amide form (A) and iminol form (B).
Figure 10B:
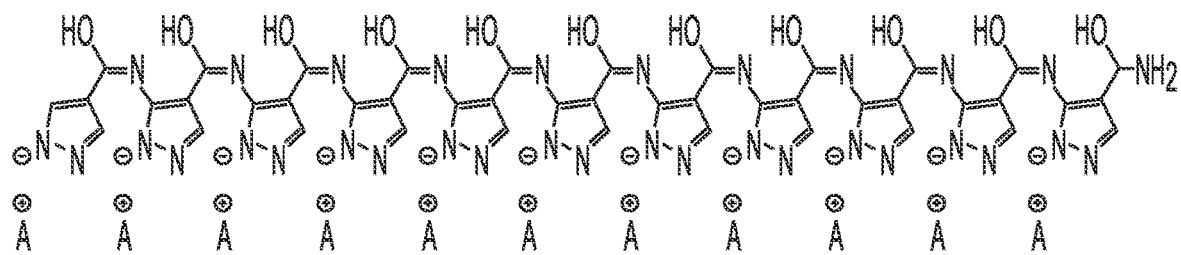
Figure 11:
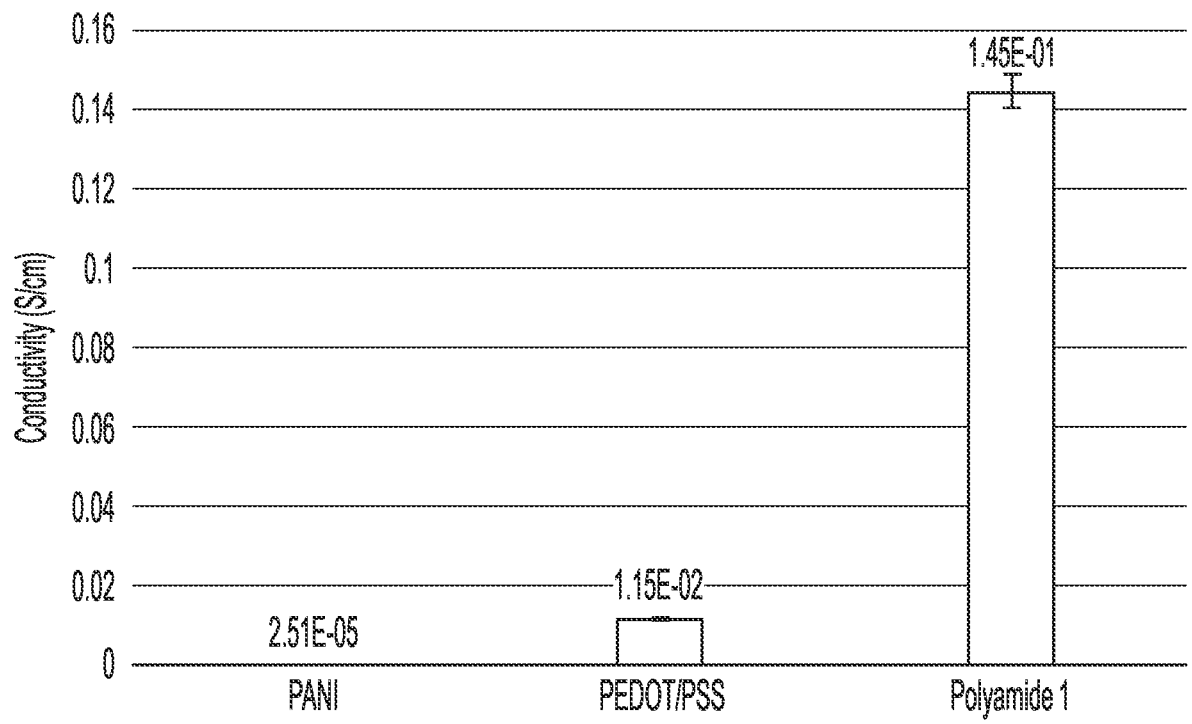
FIGS. 11 and 12 compare of conductivities of polymers in undoped states and undoped states, respectively.
Figure 12:
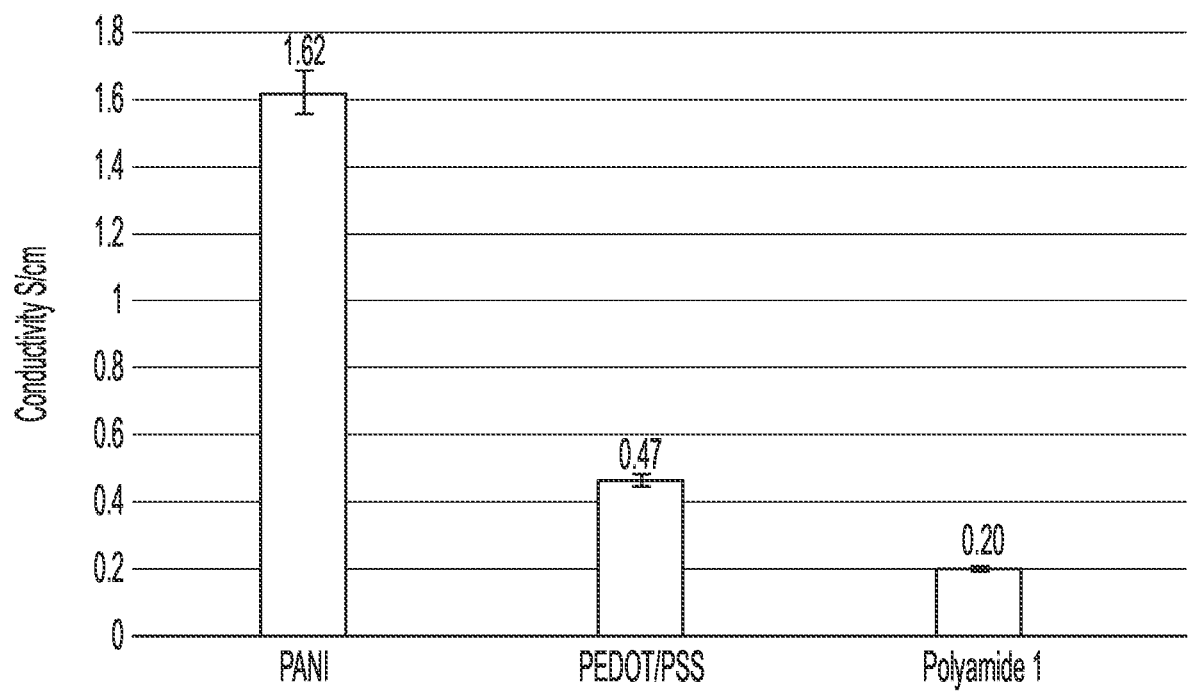

FIG. 9 depicts the proposed structures of Polyamide 1 in its electrically neutral form. The 9-mer species is represented. The top structure (A) is the polyamide form, whereas the bottom structure is the polyiminol form. FIG. 10 depicts the proposed structures of Polyamide 1 in its n-doped state, where the nitrogen at the 1-position of the pyrazole ring is negatively charged. The polymer is transformed into this state by either 1) application of a reducing voltage in the presence of electrolyte, or 2) treating the material with a base such as tetrabutylammonium hydroxide. In FIGS. 11 and 12, the conductivities of Polyamide 1 are compared with the conventional conducting polymers PEDOT/PSS and PANI. The polymers are compared in their doped and undoped states. When all polymers are in the undoped state, Polyamide (1) is 5750-fold more conducting than PANI, and 12.6-fold more conducting than PEDOT/PSS. When the polymers are in the doped state, Polyamide (1) is the least conducting of the three, 8-fold less conducting than PANI and 2.5-fold less conducting than PEDOT-PSS. However, because of the very low conductivities of the conventional conducting polymers in their undoped states, overall Polyamide 1 is the best performer with regard to conductivity.

A series of studies was performed to compare the thermal stabilities of the polymers, in terms of both conductivity and thermal decomposition activation energies. For the former, electrodes coated with thin films (~10 microns) of polymer were held at elevated temperatures for various time periods, and their conductivities were recorded as a function of time. For the latter, thermogravimetric analysis was performed on the polymers, and plots of weight loss versus temperature were generated. This allowed the thermal decomposition activation energies to be calculated by constructing plots of ln (heating rate) versus 1/T. The temperature T is that at which a given percent weight loss is reached, with values of 75%, 70%, 65%, and 60% being used. The slopes of the plots are proportional to the thermal decomposition activation energies of the materials.

Figure 13:
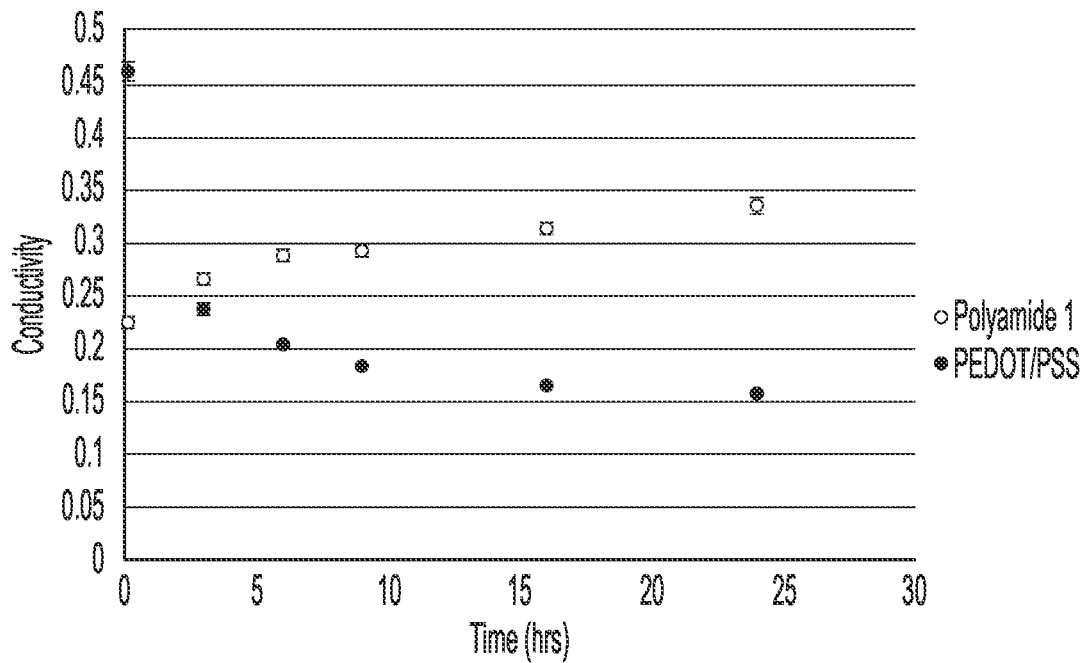
FIG. 13 shows conductivity vs. time for Polyamide 1 and PEDOT/PSS at 150° C.

FIG. 13 depicts the conductivities of PEDOT/PSS and Polyamide 1 as a function of time, while undergoing annealing at 150° C. for 24 hours. PEDOT/PSS undergoes a gradual decline in conductivity over the period, reaching a quasi-steady state near the 24-hour period at a conductivity of less than one half of the starting value. Interestingly, Polyamide (1) showed the opposite behavior, with conductivity increasing gradually over the 24 hour period, and reaching a quasi-steady state near the end of the time period. As discussed above, the conductivity decline of the PEDOT/PSS may arise from a heat-induced decrease in polymer grain size, inhibiting grain-to-grain electron hopping mechanisms. The heat-induced conductivity enhancement of the Polyamide (1) may arise simply from the gradual baking out of trapped casting solvent. Alternatively, it may be caused by a thermally induced transformation of the polymer from its polyamide to its polyiminol form [8]. In the latter, the polymer is fully conjugated which may account for the increased conductivity. In the polyamide form the polymer is not fully conjugated.

Figure 14:
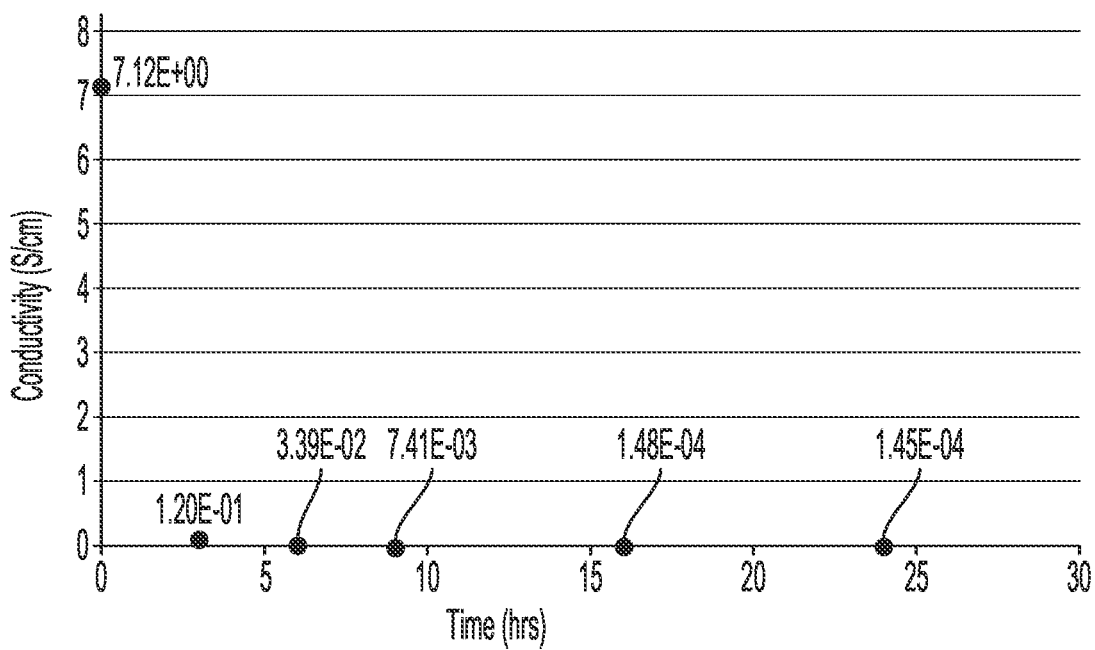
FIG. 14 shows conductivity vs. time for PANI at 150° C.

In FIG. 14, the conductivity of PANI as a function of time is depicted while undergoing annealing at 150° C. for 24 hours. The polymer exhibits an exponential drop in conductivity at early times and retains the low conductivity throughout the time course. Its value at 24 hours is 50,000-fold less than the initial value. As discussed above, this effect may arise from thermally-induced deprotonation (undoping) involving acid release by diffusion, dehydration, and evaporation. Other mechanisms that may contribute to the conductivity loss include aromatic ring substitution by dopant acids containing sulfonate or chloride ions.

Evidently, Polyamide 1 is not susceptible to the types of thermal degradation processes that affect PEDOT/PSS and PANI. The presence of the amide linkage may be a primary factor accounting for its thermal stability. The orientation of its hydrogen-bonding groups may allow it to form an extended bonding network that may also contribute to thermal stability.

Figure 15:
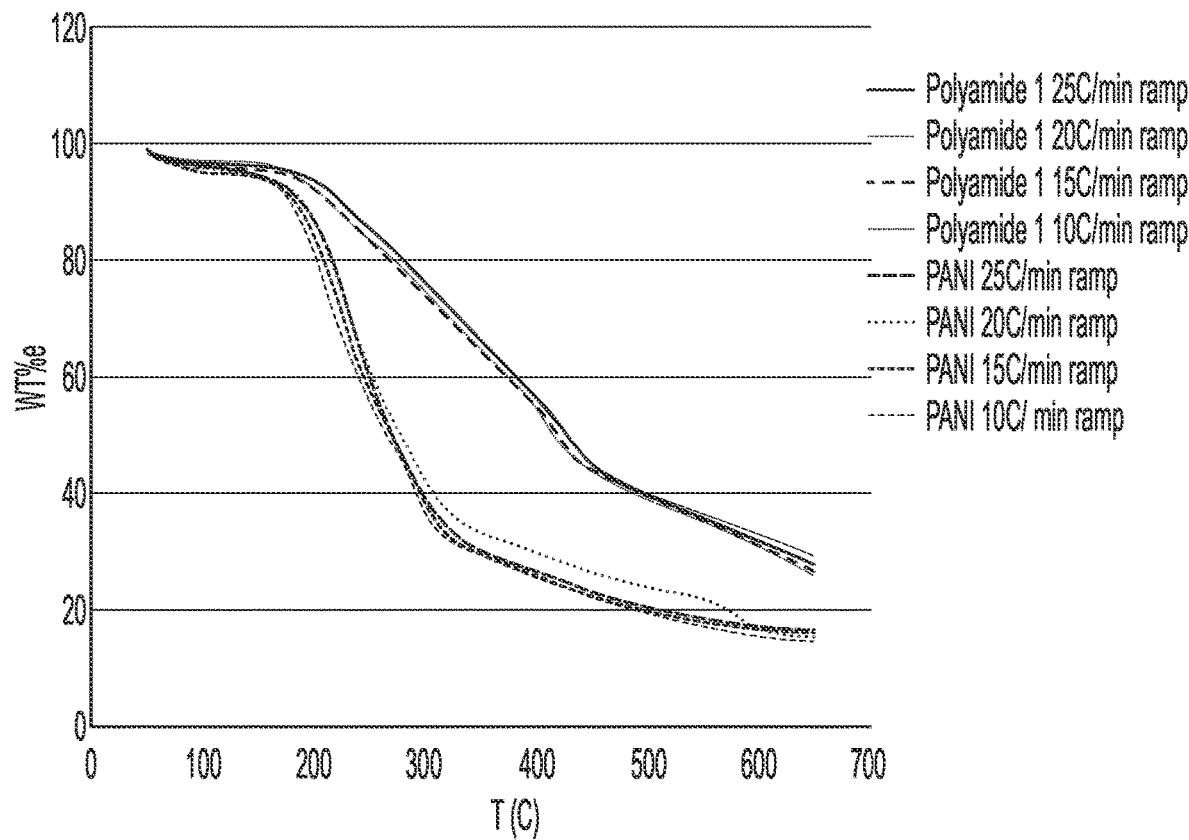
FIG. 15 provides a thermogravimetric analysis of Polyamide 1 and PANI.
Figure 16:
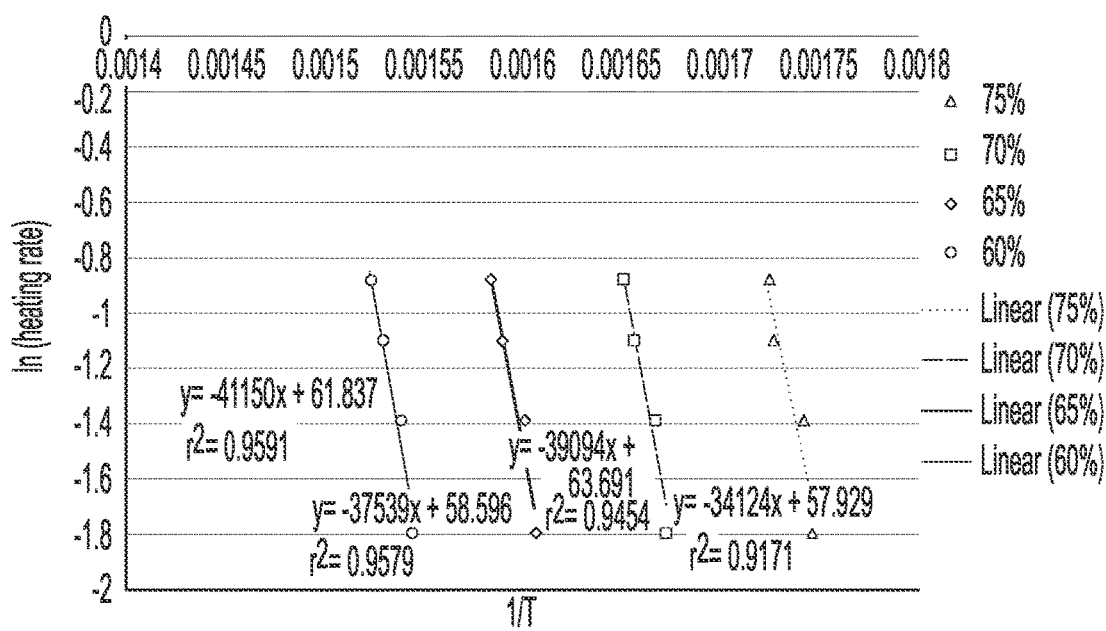
FIG. 16 is a plot of ln(heating rate) vs. 1/T for Polyamide 1.
Figure 17:
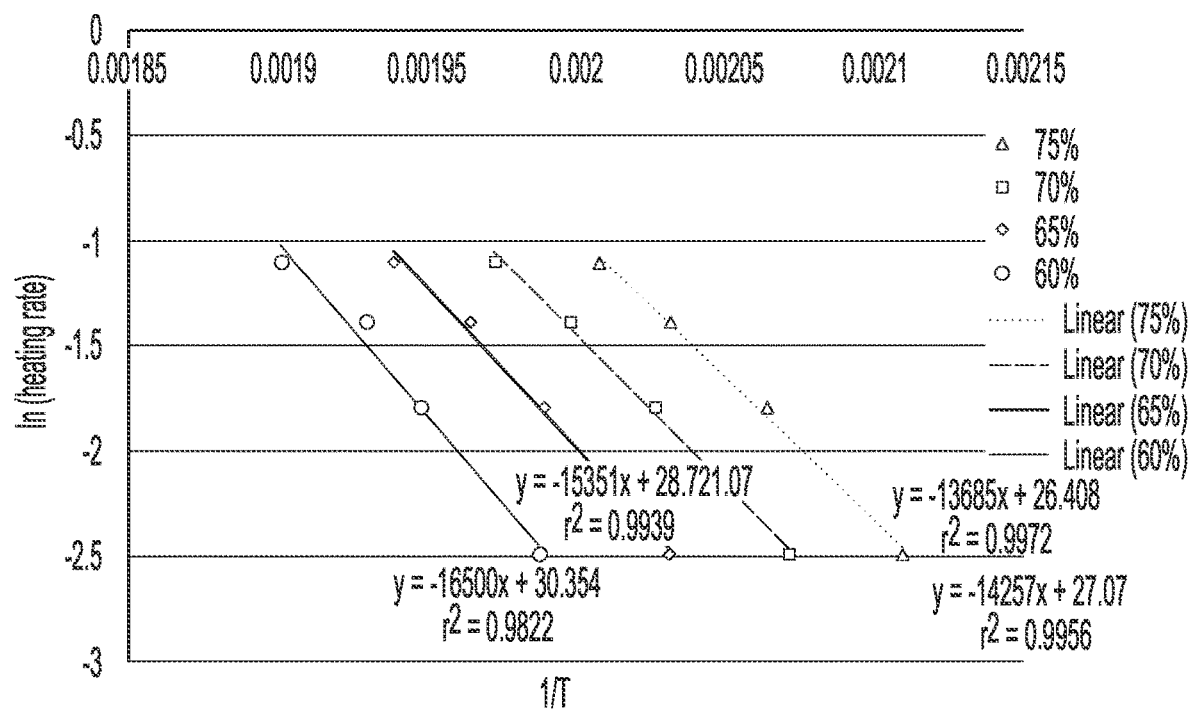
FIG. 17 is a plot of ln(heating rate) vs. 1/T for PANI.
Figure 18:
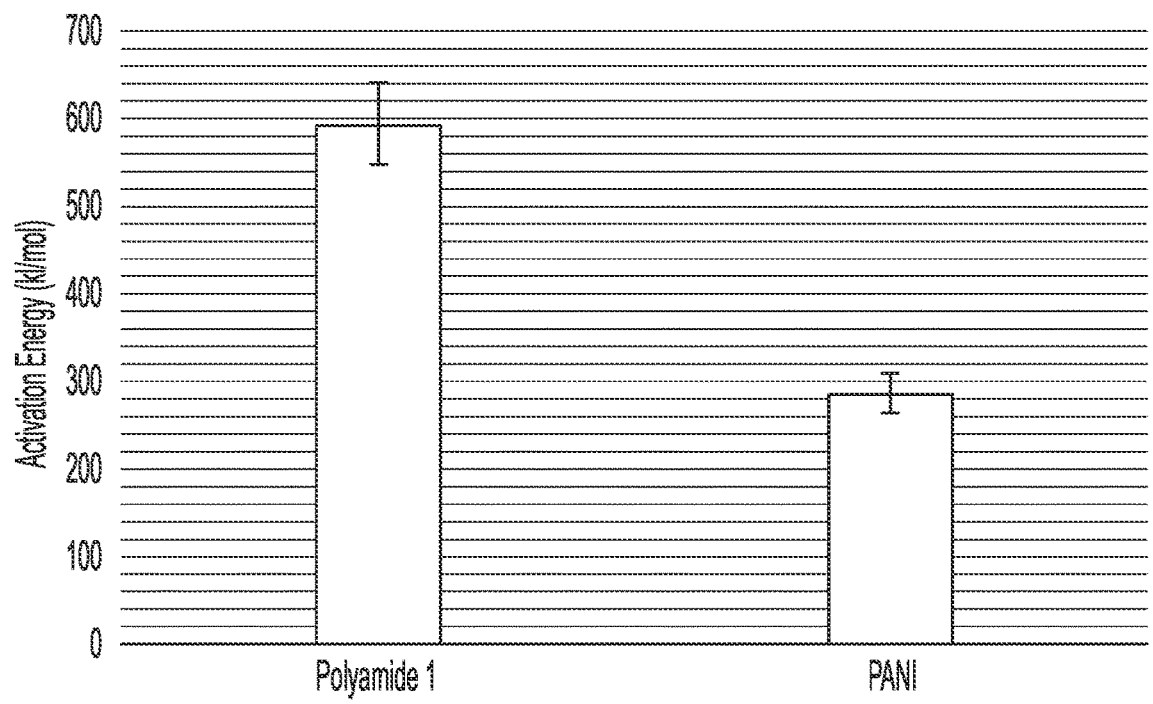
FIG. 18 shows the activation energies of Polyamide 1 and PANI.

FIG. 15 shows the thermogravimetric behavior of PANI and Polyamide 1, using heating with temperature ramp rates of 10° C./min, 15° C./min, 20° C./min, and 25° C./min, under nitrogen. PANI encounters a 50% weight loss at a temperature of ~280° C., whereas Polyamide 1 reaches this amount at ~420° C. The much higher mass loss shown by PANI may arise from polymer degradation by chain scission and volatilization. Polyamide 1 may be less susceptible to these processes because of the stability of the amide linkage and the presence of the electron-rich pyrazole ring. FIGS. 16 and 17 depict plots of ln (heating rate) versus 1/T for each polymer. The temperature T is that at which a given percent weight loss is reached, with values of 75%, 70%, 65%, and 60% being used. The slopes of the plots are proportional to the thermal decomposition activation energies of the materials. FIG. 18 compares the activation energies of Polyamide (1) and PANI, with that of the former more than twice as high as that of the latter (595 kJ/mol vs. 282 kJ/mol).

Molecular modeling indicates that Polyamide 1 is capable of assembling into extended hydrogen-bonding structures (FIG. 19). This suggests that the material, if processed correctly, will have a high mechanical strength, in addition to its conductivity and thermal stability.

Further Embodiments

It should be possible to form Polyamide 1 by allowing the starting monomer 3-amino-1H-pyrazole-4-carboxylate to slowly polymerize in the absence of stoichiometric oxidant, via a condensation reaction. It may be best to perform this reaction in a non-aqueous solvent, and optionally with a thermally activated initiator suitable for use in non-aqueous solvents, such as 2, 2'azobisisobutyronitrile (AIBN).

It is expected that polymers of more than 20 repeat units should be obtainable as well as oligomers having 20 or fewer repeat units.

One might use 3-amino-1H-pyrazole-5-carboxylate as a starting material instead of, or in addition to, 3-amino-1H-pyrazole-4-carboxylate.

Also contemplated are poly 3-amino-1H-pyrazole-4-carboxylate, poly 3-amino-5-chloro-1H-pyrazole-4-carboxylate, poly 3-amino-5-bromo-1H-pyrazole-4-carboxylate, poly 3-amino-5-fluoro-1H-pyrazole-4-carboxylate, poly 3-amino-5-iodo-1H-pyrazole-4-carboxylate, poly 3, 5-diamino-1H-pyrazole-4-carboxylate, poly 3-amino-5-NHR1-1H-pyrazole-4-carboxylate, poly 3-amino-5-NR2-1H-pyrazole-4-carboxylate, poly 3-amino-5-hydroxy-1H-pyrazole-4-carboxylate, and poly 3-amino-5-OR-1H-pyrazole-4-carboxylate (R=alkyl and/or aromatic) as well as methods of preparing these, as discussed below.

Concerning poly 3-amino-5-chloro-1H-pyrazole-4-carboxylate: poly 3-amino-1H-pyrazole-4-carboxylate of any chain length is reacted in 3%-12.5% sodium hypochlorite solution in water. The reaction is practically quantitative, 1:1 molar ratio, 5-position C—H on polymer and NaClO.

Concerning poly 3-amino-5-bromo-1H-pyrazole-4-carboxylate: poly 3-amino-1H-pyrazole-4-carboxylate of any chain length is reacted in 3%-12.5% Sodium Hypobromite solution in water. The reaction is practically quantitative, 1:1 molar ratio, 5-position C—H on polymer and NaBrO.

Concerning poly 3-amino-5-fluoro-1H-pyrazole-4-carboxylate: poly 3-amino-1H-pyrazole-4-carboxylate of any chain length can be fluorinated via the Fowler process (CoF$_3$ and F$_2$). There are Electrochemical Fluorination methods (Simons and Phillps methods) also available to accomplish this facile fluorination.

Concerning poly 3-amino-5-iodo-1H-pyrazole-4-carboxylate: poly 3-amino-1H-pyrazole-4-carboxylate of any chain length is reacted in 3%-12.5% Sodium Hypoiodite solution in water. The reaction is practically quantitative, 1:1 molar ratio, 5-position C—H on polymer and NaIO.

Concerning poly 3, 5-diamino-1H-pyrazole-4-carboxylate, in general a synthesis can be accomplished via direct amination by replacement of the halogens (Cl, Br, I) in the 5-positions of starting compounds. In one preparation, poly 3-amino-5-chloro-1H-pyrazole-4-carboxylate, or poly 3-amino-5-bromo-1H-pyrazole-4-carboxylate, or poly 3-amino-5-iodo-1H-pyrazole-4-carboxylate, of any chain length, is reacted with NH$_4$OH in aqueous media to yield the product, poly 3, 5-diamino-1H-pyrazole-4-carboxylate. In another preparation, poly 3-amino-5-chloro-1H-pyrazole-4-carboxylate, or poly 3-amino-5-bromo-1H-pyrazole-4-carboxylate, or poly 3-amino-5-iodo-1H-pyrazole-4-carboxylate, of any chain length, is reacted with anhydrous ammonia (2-4 atmospheres) to yield the product, poly 3, 5-diamino-1H-pyrazole-4-carboxylate.

Concerning poly 3-amino-5-$NHR_1$-1H-pyrazole-4-carboxylate and poly 3-amino-5-$NR_2$-1H-pyrazole-4-carboxylate, in general a synthesis can be accomplished via direct amination by replacement of halogens (Cl, Br, I) in the 5-positions of starting compounds with aminated moiety. Poly 3-amino-5-chloro-1H-pyrazole-4-carboxylate, or poly 3-amino-5-bromo-1H-pyrazole-4-carboxylate, or poly 3-amino-5-iodo-1H-pyrazole-4-carboxylate, of any chain length, is reacted with amine candidate ($NRH_2$ or $NR_2H$) in either neat media or in aqueous media to yield the product(s), poly 3-amino-5-NHR1-1H-pyrazole-4-carboxylate or poly 3-amino-5-NR2-1H-pyrazole-4-carboxylate, as appropriate.

Concerning poly 3-amino-5-hydroxy-1H-pyrazole-4-carboxylate, in general a synthesis can be accomplished via direct hydroxylation by replacement of halogens (Cl, Br, I) in the 5-positions of starting compounds with hydroxyl moiety. Poly 3-amino-5-chloro-1H-pyrazole-4-carboxylate, or poly 3-amino-5-bromo-1H-pyrazole-4-carboxylate, or poly 3-amino-5-iodo-1H-pyrazole-4-carboxylate, of any chain length, is reacted with hydroxyl base media (NaOH, LiOH, KOH, aqueous) at concentration ranging from 0.1 to 10 molar to yield the product, poly 3-amino-5-hydroxy-1H-pyrazole-4-carboxylate Concerning poly 3-amino-5-OR-1H-pyrazole-4-carboxylate (R=alkyl, aromatic), in general a synthesis can be accomplished via replacement of the halogens (Cl, Br, I) in the 5-positions of starting compounds with RO- moiety. Poly 3-amino-5-chloro-1H-pyrazole-4-carboxylate, or poly 3-amino-5-bromo-1H-pyrazole-4-carboxylate, or poly 3-amino-5-iodo-1H-pyrazole-4-carboxylate, of any chain length, is reacted in a media of $Na^+$ alkoxide ($Na^+RO^-$) in an appropriate conjugate acid, alkyl-OH solvent. Wherein $Na^+$ can be substituted by either $K^+$, $Li^+$ and R can be methyl, ethyl, propyl, other alkyl moiety, and any derivatized phenolic moiety. Employing $Na^+RO^-$ concentration ranging from 0.1 to 10 molar to yield the product, poly 3-amino-5-OR-1H-pyrazole-4-carboxylate.

Concerning poly 3-amino-5-nitro-1H-pyrazole-4-carboxylate, a first preparation entails the direct nitration of poly 3-amino-1H-pyrazole-4-carboxylate. There are several nitration methods to achieve the replacement of the hydrogen. The medium required to perform the transformation without destruction of the polymer chain is a function the concentration of nitronium cation and other factors (temperature, solvent media). Examples of increasingly strong media are (i) nitric acid (70%), (ii) nitric acid (99%), (iii) acetic anhydride and nitric acid, (iv) sulfuric acid and nitric acid, and (v) sulfuric acid, oleum, and nitric acid. This wide range of nitrating conditions, with modifications, allows for the product. A second preparation involves the direct nitrosation/oxidation of Poly 3-amino-1H-pyrazole-4-carboxylate. The nitrosation reaction is very mild. Employing $NaNO_2$ in acid media replaces the 1-H with nitroso moiety (—NO). This C—NO is the easily oxidized with $HNO_3$ to yield the product. A third preparation entails the oxidation of poly 3, 5-diamino-1H-pyrazole-4-carboxylate. The 5-$NH_2$ moiety oxidized to 5-$NO_2$ moiety by employing $H_2O_2$ (3%-10%), or peroxide/acid media.

Moreover, when the compound is not poly 3-amino-1H-pyrazole-4-carboxylate, the compound might be prepared via the chemical derivatization of poly 3-amino-1H-pyrazole-4-carboxylate.

Advantages

Polyamide 1 has an electrical conductivity that enables it to be useful in a variety of applications, and has a high stability towards thermal decomposition. In contrast, other commercially available conducting polymers are far less thermally stable. It is formed in a simple one-step synthesis with yields as high as 90%. Molecular modeling indicates that Polyamide 1 is capable of assembling into extended hydrogen-bonding structures (FIG. 19). This suggests that the material, if processed correctly, will have a high mechanical strength in addition to its conductivity and thermal stability.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

[1] M. Trchová, I. Šeděnková, E. Tobolková, J. Stejskal, Polymer Degradation and Stability, 86, (2004), 179-185.
[2] M. Hokazono, H. Anno, N. Toshima, J. Electronic Materials, 43, 6, (2014), 2196-2201.
[3] E. Vitoratos, S. Sakkopoulos, E. Dalas, N. Paliatsas, D. Karageorgopoulos, F. Petraki, S. Kennou, S. A. Choulis, Organic Electronics, 10, (2009), 61-66.
[4] L. Stepian, A. Roch, R. Tkachov, B. Leupolt, L. Han, N. Ngo, C Leyens, Synthetic Metals, 225, (2017), 49-54.
[5] A. Cetin, A. Korkmaz, E. Erdoğan, A. Kosemen, Optical Materials, 85, (2018), 79-85.
[6] A. Cetin, A. Korkmaz, Materials Chemistry and Physics 222, (2019), 37-44.
[7] A. Cetin, A. Korkmaz, I. Bildirici. Colloid and Polymer Science, 296, (2018), 1249-1257.
[8] E. Raczyńska, W. Kosińska, B. Ośmiałowski, and R. Gawinecki, Chem. Rev. 105, (2005), 3561-3612.

The invention claimed is:

1. A material comprising poly(3-amino-1H-pyrazole-4-carboxylate).

2. The material of claim 1, wherein the poly(3-amino-1H-pyrazole-4-carboxylate) has from 2 to 20 repeat units.

3. A method of preparing poly(3-amino-1H-pyrazole-4-carboxylate) comprising:
    reacting 3-amino-1H-pyrazole-4-carboxylate with an aqueous solution of R1 hydroxide; then
    adding R2 persulfate; and then
    allowing a reaction to form a product comprising poly(3-amino-1H-pyrazole-4-carboxylate),
    wherein R1 denotes one singly charged cation and R2 denotes either (a) two singly charged cations or (b) one doubly charged cation.

4. The method of claim 3, wherein said R1 hydroxide is potassium hydroxide and said R2 persulfate is sodium persulfate.

5. The method of claim 3, wherein said R1 hydroxide is potassium hydroxide and said R2 persulfate is copper persulfate.

6. The method of claim 3, further comprising extraction of the product with a non-aqueous solvent.

7. The method of claim 6, wherein the non-aqueous solvent is N-methyl pyrrolidone.

8. A material comprising a compound selected from the group consisting of poly(3-amino-1H-pyrazole-4-carboxylate), poly(3-amino-5-chloro-1H-pyrazole-4-carboxylate), poly(3-amino-5-bromo-1H-pyrazole-4-carboxylate), poly(3-amino-5-fluoro-1H-pyrazole-4-carboxylate), poly(3-amino-5-iodo-1H-pyrazole-4-carboxylate), poly(3,5-diamino-1H-pyrazole-4-carboxylate), poly(3-amino-5-NHR-1H-pyrazole-4-carboxylate), poly(3-amino-5-N(R)$_2$-1H-pyrazole-4-carboxylate), poly(3-amino-5-hydroxy-1H-pyrazole-4-carboxylate), and poly(3-amino-5-OR-1H-pyrazole-4-carboxylate), wherein R is an alkyl or aromatic group.

9. The material of claim 8, wherein said compound comprises from 2 to 20 repeat units.

10. A method of preparing the material of claim 8, comprising:

reacting a monomer with an aqueous solution of R1 hydroxide; then adding R2 persulfate; and then allowing a reaction to form a product comprising said material, wherein R1 denotes one singly charged cation and R2 denotes either (a) two singly charged cations or (b) one doubly charged cation;

wherein the monomer is selected from the group consisting of 3-amino-1H-pyrazole-4-carboxylate, 3-amino-5-chloro-1H-pyrazole-4-carboxylate, 3-amino-5-bromo-1H-pyrazole-4-carboxylate, 3-amino-5-fluoro-1H-pyrazole-4-carboxylate, 3-amino-5-iodo-1H-pyrazole-4-carboxylate, 3,5-diamino-1H-pyrazole-4-carboxylate, 3-amino-5-NHR-1H-pyrazole-4-carboxylate, 3-amino-5-N(R)$_2$-1H-pyrazole-4-carboxylate, 3-amino-5-hydroxy-1H-pyrazole-4-carboxylate, and 3-amino-5-OR-1H-pyrazole-4-carboxylate, and wherein R is an alkyl or aromatic group.

11. The method of claim 10, wherein the R1 hydroxide is selected from the group consisting of potassium hydroxide and sodium hydroxide, and wherein the R2 persulfate is selected from the group consisting of sodium persulfate and copper persulfate.

12. A material comprising a compound selected from the group consisting of poly(3-amino-5-chloro-1H-pyrazole-4-carboxylate), poly(3-amino-5-bromo-1H-pyrazole-4-carboxylate), poly(3-amino-5-fluoro-1H-pyrazole-4-carboxylate), poly(3-amino-5-iodo-1H-pyrazole-4-carboxylate), poly(3,5-diamino-1H-pyrazole-4-carboxylate), poly(3-amino-5-NHR-1H-pyrazole-4-carboxylate), poly(3-amino-5-N(R)$_2$-1H-pyrazole-4-carboxylate), poly(3-amino-5-hydroxy-1H-pyrazole-4-carboxylate), and poly(3-amino-5-OR-1H-pyrazole-4-carboxylate), wherein R is an alkyl or aromatic group, and wherein the material is formed by chemical derivatization of poly(3-amino-1H-pyrazole-4-carboxylate).

* * * * *